United States Patent [19]

D'Alessio et al.

[11] 4,149,093
[45] Apr. 10, 1979

[54] BATTERY PROTECTION DEVICE

[75] Inventors: Frank P. D'Alessio, Franklin Lakes; Warren Andrews, Upper Saddle River, both of N.Y.

[73] Assignee: U.S. Autotronics, Matawan, N.J.

[21] Appl. No.: 829,398

[22] Filed: Aug. 31, 1977

[51] Int. Cl.² ............................................. H02H 7/18
[52] U.S. Cl. .................................. 307/10 BP; 320/40
[58] Field of Search ......................... 307/10 BP, 10 R; 320/40, 43, 44, 45, 47, 48; 322/99

[56] References Cited
U.S. PATENT DOCUMENTS

| 3,474,296 | 10/1969 | Rickey | 320/40 X |
| 3,967,169 | 6/1976 | Ellenberger | 320/40 |
| 4,005,344 | 1/1977 | Gaind et al. | 307/10 BP |

Primary Examiner—Herman J. Hohauser
Attorney, Agent, or Firm—Blum, Moscovitz, Friedman & Kaplan

[57] ABSTRACT

A device for providing protection to a battery utilized as an auxiliary and starting power source for a motor-generator. The device includes a switch positioned intermediate the battery and the load and circuit means for integrating current flow from said battery when said generator is inoperative and automatically opening the switch when the product of said integration reaches a predetermined threshold level. The device is particularly adapted for a vehicular battery and uses a length of the battery cable for detecting current flow.

20 Claims, 10 Drawing Figures

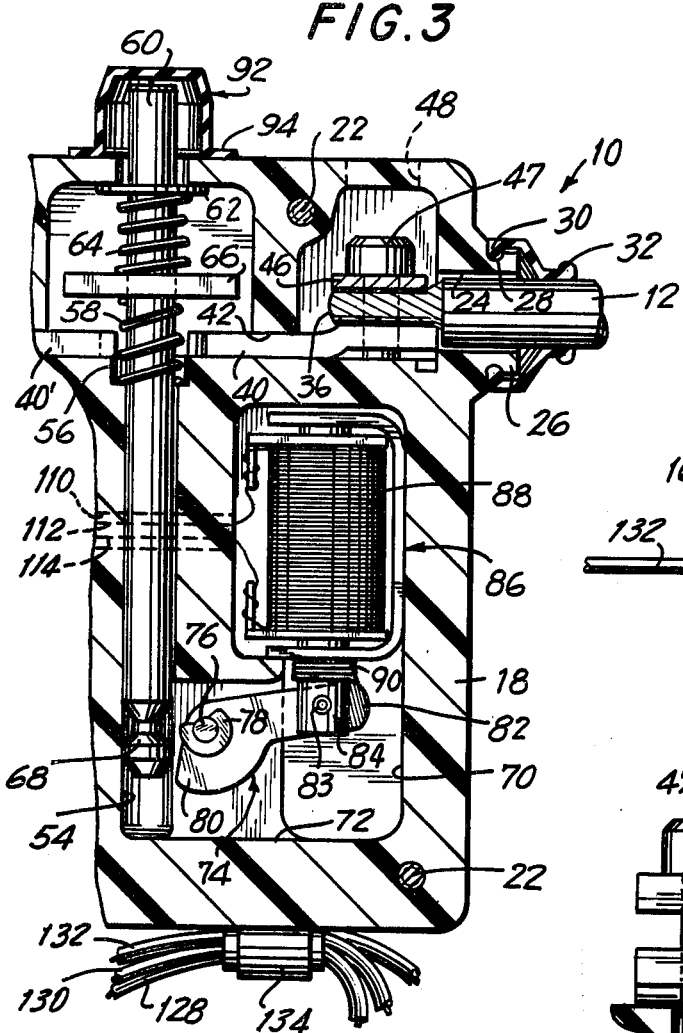
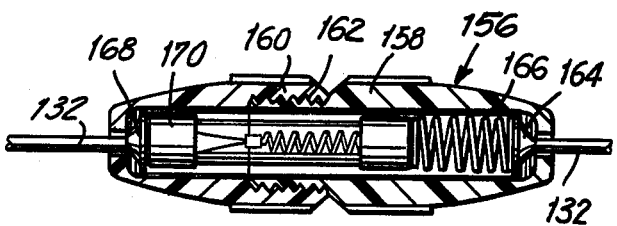
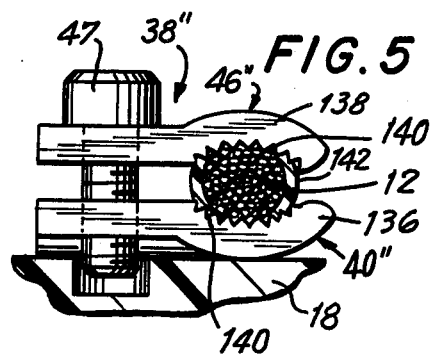
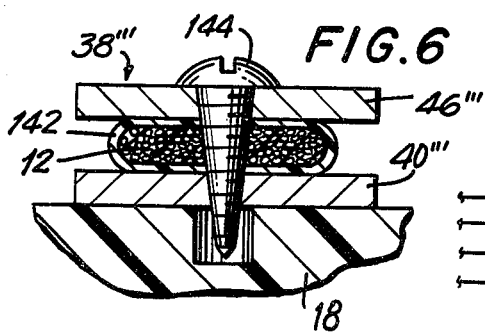
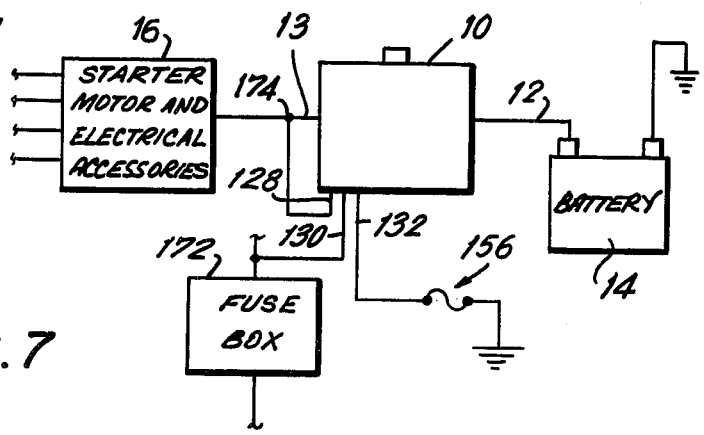

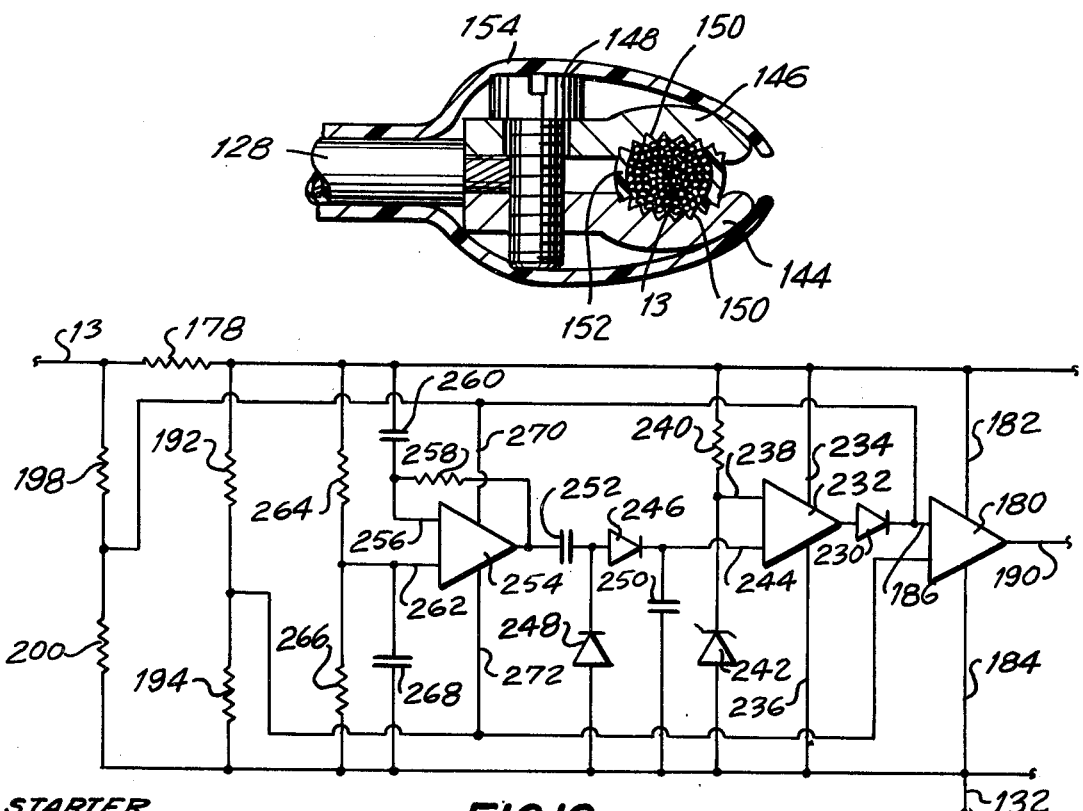
FIG. 8
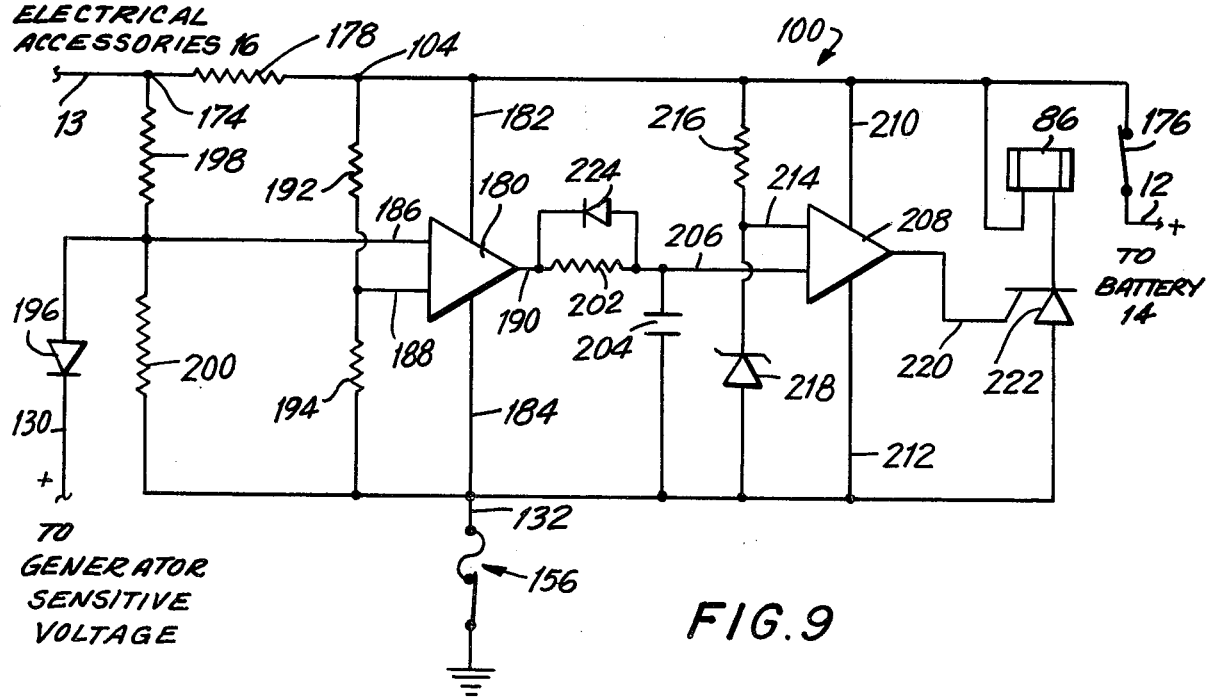
FIG. 10
FIG. 9

BATTERY PROTECTION DEVICE

BACKGROUND OF THE INVENTION

This invention relates generally to devices for preventing the exhaustion of storage batteries utilized as auxiliary and starting power sources for motor-generator sets. In vehicular power systems, it is customary to utilize a fuel-powered motor, such as a gasoline engine, as the primary power source. During normal operation, the electrical load of the vehicle is driven off a generator powered by said motor. Such electrical load may include lights, small electrical motors for operation of auxiliary apparatus and audio equipment such as radios. Such vehicles are generally provided with a storage battery for the purpose of starting the motor and also for the purpose of providing auxiliary power for the electrical devices in the vehicle when the motor is in an off state.

By way of specific example, in an automobile, the electrical appliances might include the various lights (both safety and illumination), an electric defroster, motors for power accessories such as locks and windows, a radio, a stereo, etc. When the motor is on, all of these electrical devices are powered by the generator driven by the motor. When the motor is off, these devices may be powered by the battery, giving rise to the risk that the battery will be drained to a level at which it retains insufficient charge to restart the engine. Such an occurrence can result from the inadvertent leaving of lights or other electrical appliances in an on state when the vehicle is left unattended. Not only does the running down of the battery under such circumstances cause inconvenience, but it may also create safety hazards to the driver and passengers.

By providing a resettable device for automatically cutting off the flow of current from the battery after a predetermined current flow, when the generator is inoperative, the foregoing problems can be overcome.

SUMMARY OF THE INVENTION

Generally speaking, in accordance with the invention, a device for protecting a battery which provides starting power to a motor and auxiliary power to a load normally powered by a generator driven by said motor, is provided. Said device includes mechanical switch means connected intermediate said battery and load, first circuit means for detecting current flowing from said battery to said load and integrating said current, second circuit means for producing a control output signal when the product of said integration reaches a predetermined level and electrical switch means operatively coupled to said mechanical switch means and to said second circuit means for opening said mechanical switch means in response to said control output signal. Said first circuit means is operatively coupled to said generator so as to be rendered inoperative when said generator is operative.

Said device may be mounted in a break in the electrical cable intermediate said battery and load, said first circuit means including a length of said cable for detecting current from said battery to said load. Said mechanical switch means may be manually resettable. Said device may include further switch means for selectively rendering said device inoperative.

Accordingly, an object of the present invention is to provide a battery protection device particularly adapted for vehicular power systems.

Another object of the invention is to provide a device for preventing the running down of batteries when the normal motor-generator power source is off.

A further object of the invention is to provide a device for preventing the unintentional draining of vehicular batteries which is compact, light in weight and readily installed.

Still other objects and advantages of the invention will in part be obvious and will in part be apparent from the specification and drawings.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a fragmentary sectional view of the battery protection device of FIG. 2 showing the mechanical switch in its open position;

FIG. 4 is a sectional view of a fuse-switch in accordance with the invention;

FIGS. 5 and 6 are sectional views of alternate embodiments of cable terminal devices for incorporation in the battery protection device in accordance with the invention;

FIG. 7 is a block diagram depicting the connection of the battery protection device in accordance with the invention;

FIG. 8 is a sectional view of an insulated coupler utilized in the connection of the battery protection device in accordance with the invention;

FIG. 9 is a circuit diagram of the battery protection device in accordance with the invention; and FIG. 10 is a partial circuit diagram showing an alternate embodiment in accordance with the invention.

DESCRIPTION OF THE PREFERRED EMBODIMENTS

Figure 1:
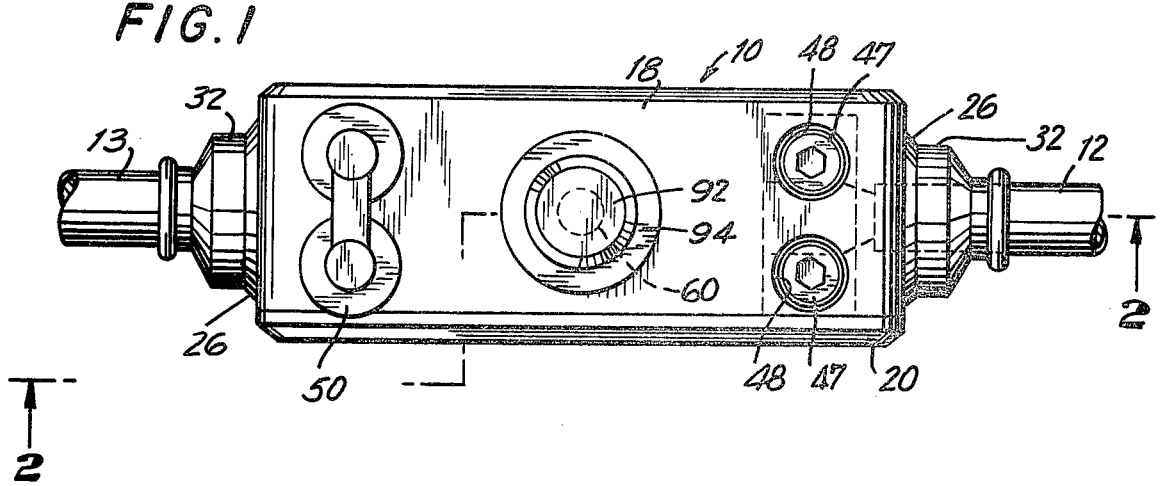
FIG. 1 is a top plan view of the battery protection device in accordance with the invention mounted on a cable.
Figure 2:
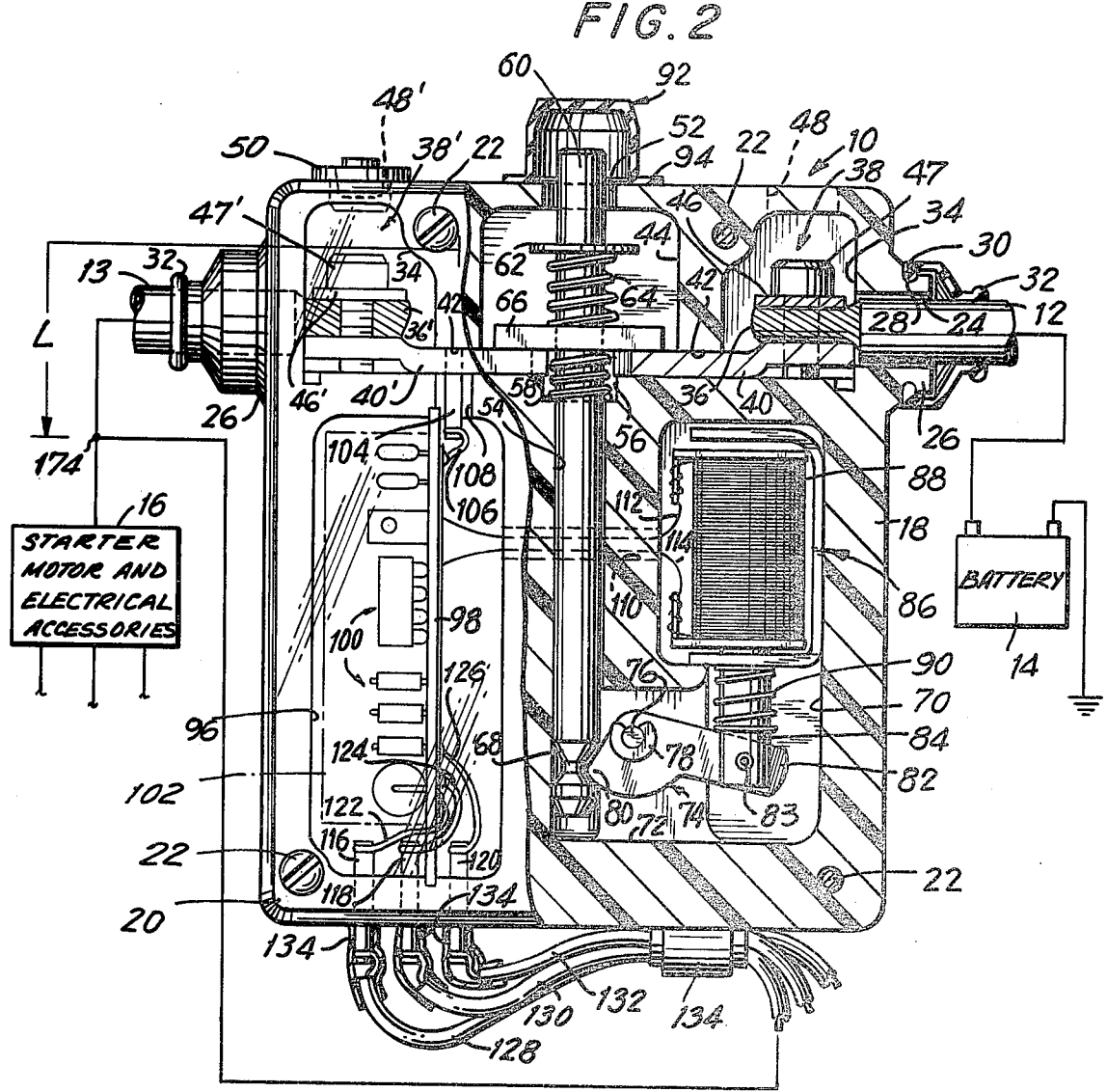
FIG. 2 is in part a sectional view taken along lines 2—2 of FIG. 1 and in part a block diagram illustrating the connection of the battery protection device in accordance with the invention.

Referring now to the drawings, the battery protection device 10 shown generally in FIGS. 1, 2 and 3 is connected at a break in battery cable 12, 13 between a battery 14 and a load, depicted schematically in FIGS. 2 and 7 as consisting of a starter motor and electrical accessories 16.

Battery protection device 10 includes a housing 18 closed by cover 20, said cover being held in position by screws 22. Housing 18 and cover 20 are preferably formed of a plastic material, the transparent cover illustrated in the drawings being shown by way of illustration. In a commercial product, the cover 20 would be opaque and suitable gasket means could be provided between the cover and housing to insure a water-tight seal. Housing 18 is formed with openings 24, one in the upper region of each side wall thereof, the ends of cables 12 and 13 extending through openings 24. Housing 18 is formed with an outward projection 26 surrounding each opening 24, each projection 26 being formed with an annular groove 28 in the periphery thereof at a position spaced from the end thereof to accommodate an annular rib 30 on a corresponding sleeve member 32, sleeve members 32 snugly engaging the respective outer peripheries of the insulation of cables 12 and 13 to provide a water-tight seal for openings 24. Each opening 24 communicates with an upper side chamber 34 defined in housing 18, the stripped conductive wire 36, 36' of each of cables 12, 13 project into the associated upper side chamber 34 for retention and electrical connection to a terminal assembly 38, 38'. Each terminal assembly 38, 38' includes a buss plate 40, 40' which extends through a channel 42, 42' in housing 18 from its upper side chamber 34 into an upper central chamber 44. Conductive wires 36, 36' are held between the associated buss plate 40, 40' and a terminal plate 46, 46' by means of bolts 47, 47'. The top wall of housing 18 is formed with two pair of openings 48 which provide access to bolts 47 for the manipulation thereof to couple the battery protection device 10 to cables 12 and 13. A cap assembly 50, only one of which is depicted in FIGS. 1 and 2, seals openings 48, 48' to provide a water-tight seal, said cap assemblies being readily removed if bolts 47, 47' require manipulation.

Housing 18 is formed with a central opening 52 in the top wall thereof which communicates with upper central chamber 44. Housing 18 is also formed with a bore 54 which extends from central chamber 44 in registration with opening 52, bore 54 being provided with a region of increased diameter 56 adjacent upper central opening 44 to define a seat 58. Bore 54 is of a length sufficient to permit the axial displacement therein of a switch rod 60 mounted therein so as to extend through upper central chamber 44 and opening 52 as depicted in FIGS. 2 and 3 and as more particularly described below.

Annular stop member 62 is fixedly mounted to switch rod 60 at a point spaced from the upper end thereof within upper central chamber 44. A coil spring 64 extends about switch rod 60 between top member 62 and seat 58 defined in bore 54. Spring 64 supports a conductive ring 66 which extends about switch rod 60 and is dimensioned to engage and bear against a substantial surface area of buss plates 40, 40' when positioned as illustrated in FIG. 2. Switch rod 60, conductive ring 66 and coil spring 64 define a mechanical switch for the selective opening and closing of the electrical circuit between cables 12 and 13, and therefore between battery 14 and starter motor and electrical accessories 16. Buss plates 40, 40' and conductive ring 66 are dimensioned to provide minimum resistance in the battery circuit and are of substantial cross-sectional area for this purpose.

Switch rod 60 is formed with an annular groove 68 in a lower end thereof, which groove is formed with inclined walls as illustrated in FIGS. 2 and 3. Housing 18 is formed with a lower solenoid chamber on the right of bore 54 as viewed in FIG. 2, said solenoid chamber 70 communicating with the lower region of bore 54 by a passageway 72. A stop lever 74 is pivotably mounted by means of post 76 and ring washer 78 in passageway 72. Stop lever 74 is provided with a projecting portion 80 shaped to be received in annular groove 68 in switch rod 60. When so positioned, stop lever 74 holds switch rod 60 in a lower position as illustrated in FIG. 2 against the bias of spring 64, at which lower position conductive ring 66 is biased against buss plates 40, 40' to close the electrical circuit between cables 12 and 13. Stop lever 74 is also formed with a lever arm 82 which is pivotably mounted by pin 83 to the plunger 84 of a solenoid 86 mounted within solenoid chamber 70. Solenoid 86 is provided with a coil 88 which, when energized, causes plunger 84 to be drawn upwardly, as viewed in FIG. 2 against the bias of a spring 90 to the position illustrated in FIG. 3, at which position projecting portion 80 of lever arm 82 is withdrawn from notch 68 of switch rod 60, thereby permitting said switch rod to be displaced upwardly as viewed in FIG. 2 to the position illustrated in FIG. 3. This displacement is caused by the bias force of spring 64. In the position illustrated in FIG. 3, conductive ring 66 is out of electrical engagement with buss plates 40, 40' and the circuit between cables 12 and 13, and therefore battery 14 and starter motor and electrical accessories 16 is open. When the energizing current applied to coil 88 of solenoid 86 is stopped, the plunger 84 returns to the position illustrated in FIG. 2 by reason of the bias of spring 90. To reset the mechanical switch of the battery protection device 10 in accordance with the invention, it is merely necessary to then manually displace switch rod 60 downwardly as viewed in FIGS. 2 and 3 by engagement against the upper portion of said switch rod, until notch 68 thereof is engaged by projecting portion 80 of stop lever 74, so that the assembly returns to the position of FIG. 2.

Opening 52 in housing 18 is sealed by a resilient cap member 92 formed with an annular flange portion 94 for sealing engagement against housing 18. Resilient cap member 92 permits the manual manipulation of switch rod 60 to reset the switch as described above, without disturbing the water-tightness of the structure. Housing 18 is also provided with a circuit chamber 96 which is designed to receive and retain a printed circuit board 98 containing the circuit 100 of the battery protection device in accordance with the invention. Printed circuit board 98 is electrically connected to buss plate 40' by a terminal post 104 and lead 106, housing 18 being formed with a channel 108 through which said terminal post 104 extends. Housing 18 is also provided with a transverse passageway 110 through which leads 112 and 114 pass, so as to provide electrical connection to coil 88 of solenoid 86 for the energization thereof. In addition, first, second and third terminal posts 116, 118 and 120 extend through the bottom wall of housing 18 so as to project into circuit chamber 96 and so as to project outwardly from the bottom wall of said housing. Electrical connection between terminal posts 116, 118 and 120 and printed circuit board 98 is provided by leads 122, 124 and 126 respectively. Exterior electrical connection to first, second and third terminal posts 116, 118 and 120 is provided by first, second and third cables 128, 130 and 132, each of the latter terminal posts being provided with an exterior insulating sleeve 134 so as to provide water-tight protection for the post and the conductor of cables 128, 130 and 132. The latter three cables are held by a string-relief fitting 134 mounted on housing 18 to prevent strain on the electrical connection with the associated terminal posts.

Referring to FIGS. 5 and 6, two alternate constructions for terminal assemblies 38, 38' are depicted. In the embodiment of FIG. 5, a terminal assembly 38" is depicted wherein the ends of cables 12, 13 need not be stripped. In this embodiment, buss plate 40" and terminal plate 46" are each provided with jaw sections 136 and 138 respectively. Each of the jaw sections are provided with curved inner surfaces formed with teeth 140 which penetrate the insulation 142 to provide the desired electrical contact. The jaws are closed by bolts 47 in the manner described above.

In the embodiment of FIG. 6, terminal assembly 38''' is provided with an essentially flat buss plate 40''' and an essentially flat terminal plate 46'''. Again, the ends of cable 12 and 13 are not stripped of insulation 142, but rather, one or more self-tapping screws 144 are driven through the compressed ends of cables 12, 13 and into buss plate 40'''.

First cable 128 is adapted for connection to battery cable 13 at a point spaced from terminal assembly 38' as shown schematically in FIG. 2. While this connection may be made in any desired manner, one mechanism for effecting this connection is depicted in FIG. 8 wherein cable 128 is joined, by solder or otherwise to a lower jaw member 144. An upper jaw member 146 may be selectively displaced toward and away from jaw member 144 by means of bolt 148 which is journaled through upper jaw member 146 and threaded through lower jaw member 144. Upper and lower jaw members 144, 146 are both provided with teeth 150 which penetrate the insulation 152 in cable 13 to effect electrical connection. An insulating sheath 154 formed of a resilient material may be provided so as to extend substantially over jaw members 144, 146 and bolt 154, said insulating sheath being provided with slots (not shown) on the sides thereof permit passage around cable 13.

Third cable 132 would be connected to ground on the vehicle using a conventional coupler. However, it is desirable to provide a fuse in order to protect circuitry 100 and to further provide switch means which would enable the disabling of the battery protection device if desired without requiring the decoupling thereof. Accordingly, the fuse-switch assembly 156 depicted in FIG. 4 may be mounted in third cable 132. Said assembly consists of male housing 158 and female housing 160 releasably coupled by a threaded coupling 162. Male housing 158 supports a first contact 176 which in turn engages a coil spring 166. Female housing 160 supports a second contact 168. Retained between spring 166 and second contact 168 within the male and female housings is a fuse 170 of conventional constructions. During normal use, electrical connection is made between first contact 164 and second contact 168 through spring 166 and fuse 170. If it is desired to disable the circuitry of battery protection device 10, without opening the circuit between cables 12 and 13, all that is required is to separate male housing 158 from female housing 160. When so arranged, solenoid 88 is incapable of being actuated and the battery protection device will no longer be responsive to current flow from battery 14. Such arrangement might be utilized where the vehicle is broken down and it is necessary, for safety purposes, to use flashing lights for a period of time beyond that which would be permitted by the battery protection device.

Reactivation of the battery protection device 10 would merely require the recoupling of the male and female housings with fuse 170 in place.

The connection of the battery protection device 10 in accordance with the invention in the electrical system of a vehicle, for example the electrical system of an automobile, will be described in connection with FIG. 7. The first step in installation of the battery protection device in accordance with the invention is to cut the battery cable or to otherwise provide cables 12 and 13 between battery 14 and starter motor and electrical accessories 16. As will be more particularly described below, the battery protection device 10 must be positioned so as to permit a sufficient length of cable 13 to be provided for connection by first cable 128. The ends of cables 12 and 13 would be stripped (a step not required if the embodiments of FIGS. 5 and 6 were used) and coupled to terminal assemblies 38, 38' as shown in FIG. 2. Third cable 132 would be connected to ground and second cable 130 would be connected to a positive voltage representative of the operation of the generator, for example the high side of a fuse box 172. First cable 128 would be formed of a predetermined length so that, when extended from strain relief fitting 34 to its maximum length, it could be electrically coupled to cable 13 at a point 174 selected to provide a predetermined length L (FIG. 2) between the connection between terminal post 104 and buss plate 40' on the one hand and point 174. The length L represents a length of electrical conductor having substantially a predetermined resistance and, as will be more particularly described below, serves as a sensor for detection of current flow from battery 14.

Referring now to FIG. 9, circuitry 100 and the operation of battery protection device 10 will be explained. In FIG. 9, like reference numerals have been utilized to describe like elements in other figures. As depicted, switch 176 corresponds to the switch defined by switch rod 60, spring 64, conductive ring 66 and buss plates 40, 40' as actuated in response to solenoid 86. The length L of electrical conductor between point 174 and terminal post 104 is represented by resistor 178. Fuse-switch assembly 156 is represented by a conventional switch and fuse symbol and is shown connected in third cable 132 in the path to ground.

Circuitry 100 includes a first operational amplifier 180 which is connected between the high voltage of the main battery line and ground by lines 182 and 184 to provide power thereof. Operational amplifier 180 is provided with a first input line 186 and a second input line 188, the operational amplifier being adapted so that when the voltage at line 186 is greater than the voltage at line 188, the output of operational amplifier 180 at line 190 is low while when the voltage at line 188 is greater than the voltage at line 186, the output at line 190 is high. The value of the high output may be substantially proportional to the voltage difference between the inputs. The input voltage to line 188, which serves as a reference, is determined by the voltage divider defined by resistors 192 and 194, one of which may be, if desired, a variable resistor for selection of the reference voltage. Input line 186 is connected through diode 196 to second cable 130, which in turn is connected to a generator-sensitive voltage. This voltage is sufficiently high so that when the generator is operating, the voltage at line 186 is always higher than the voltage at line 188, thereby producing a low output at line 190 of operational amplifier 180. This, as will be described below, prevents the operation of solenoid 86.

In the absence of a high voltage applied through second line 130, the voltage at input line 186 of operational amplifier 180 is determined by a voltage divider consisting of resistors 198 and 200, as well as the resistance 178 defined by the length of electrical conductor between point 174 and terminal post 104. Specifically, input line 186 is coupled at the junction between resistors 198 and 200, which are in turn connected in series between point 174 and ground. Resistors 192, 194, 178, 198 and 200 define a bridge between terminal post 104 and ground, the relative values of the resistors 192 and 194 on the one hand and 198 and 200 on the other hand being selected to that when there is no load on the battery by an electrical accessory, the voltage at line 186 is higher than the voltage at line 188 and the output of operational amplifier 180 at line 190 is low. Resistors 192, 194, 198 and 200 are selected to be of sufficiently large values so as to avoid any material drain from the battery.

However, when an electrical accessory is turned on at a time that the generator is off, then the current from battery 14 through resistor 178 will change the balance of the bridge circuit so that the voltage on line 188 is higher than the voltage at line 186 to thereby provide a high output at line 190. The high output is applied to the RC circuit defined by resistor 202 and capacitor 204 which serve as an integration circuit to provide a voltage representative of the current flowing through the electrical conductor represented by resistor 178, with respect to time. The output of the integrator is at line 206 which provides one input to a second operational amplifier 208. Second operational amplifier 208 is powered through lines 210 and 212 connected between the battery and ground and is provided with a second input 214 connected to a reference voltage defined by the series connection of resistor 216 and zener diode 218 connected between the battery and ground. Zener diode 218 provides the reference voltage and when the output of the integrator at line 206 exceeds the reference voltage at line 214, the output of second operational amplifier 208 goes high (in all other cases, the output is low). The output of second operational amplifier 208 is at line 220 which is connected to the gate of SCR transistor 222. SCR transistor 222 is normally not conducting, being connected in series with the coil of solenoid 86 between ground and the battery voltage. A high voltage on line 206 as an output of second operational amplifier 208 turns on SCR transistor 222 to energize solenoid 86, causing switch 176 to open.

Accordingly, if an accessory is on so as to constitute a predetermined drain on battery 14, in terms of ampier-hours, then current flow from battery 14 will be automatically cut off. Through selective adjustment of the RC circuit represented by resistor 202 and capacitor 204 or selection of zener diode 218, this predetermined drain can be selected. If the accessory is turned off before the predetermined drain level is reached, then the output of first operational amplifier 180 goes low and capacitor 204 is discharged through diode 224 and the battery protection device 10 is available for use should another electrical accessory be turned on thereafter. Capacitor 204 will also discharge after switch 176 opens so that the battery protection device is available for use immediately after resetting of the mechanical switch.

Referring now to FIG. 10, an alternate embodiment of the circuit of FIG. 9 is depicted. Operational amplifier 180 and the bridge circuit defined by resistors 178, 192, 194, 198, and 200 remain unchanged. However, in place of diode 196 and second line 130, normally connected to a generator-sensitive voltage, the detection of the operation of the generator for the purpose of disabling the operation of the battery protection circuit is achieved electronically. This approach reduces the number of exterior lines by eliminating the need for second line 130, thereby simplifying mounting of the device to enhance its utility. Input line 186 of operation amplifier 180 is connected through diode 230 to the output of operational amplifier 232 which is powered by connection between battery and ground by means of lines 234 and 236. Input line 238 of operational amplifier 232 is connected to a reference voltage as determined by the junction between resistor 240 and zener diode 242, which are in turn connected between the battery and ground. The other input line 244 to operational amplifier 232 is connected to the output of a rectifier defined by diodes 246 and 248 and capacitor 250. Diode 246 is connected between a coupling capacitor 252 and input line 244 of operational amplifier 232 while diode 248 is connected between ground and the junction between capacitor 252 and diode 246. Capacitor 250 is connected between ground and the junction between diode 246 and input line 244. Capacitor 252 is connected at the output of operational amplifier 254 which is coupled so as to serve an AC amplifier. Specifically, input line 256 is coupled to the output by a feedback resistor 258 and the junction between input line 256 and feedback resistor 258 is connected to the battery through a capacitor 260.

The other input 262 to operational amplifier 254 is connected to the junction between resistors 264 and 266, which are connected between the battery and ground, input line 262 of operational amplifier 254 also being connected to AC ground through capacitor 268. Operational amplifier 254 is powered by connection between the battery and ground by means of lines 270,272. When the generator is not functioning, there will be no AC voltage on line 13 so that the output of operational amplifier 254 is low, rendering the output of operational amplifier 232 likewise low so that operational amplifier 180 responds to the voltage on line 186 as determined by the bridge circuit defined by resistors 192, 194, 198, 200, and 178, as described above. However, when the generator is operating, AC voltage is detected at capacitor 260, amplified by operation amplifier 254 and rectified by the rectifier defined by diodes 246 and 248 and capacitor 250 to apply a voltage at input line 244 of operational amplifier 232. Such voltage will make the output of operational amplifier 232 go high to override the effect of the above-mentioned bridge circuit, thereby insuring that the output of operational amplifier 180 is low, thereby disabling the functioning of the circuit as desired. In all other respects, the circuit of FIG. 10 functions in the same manner as the circuit of FIG. 9. If desired, operational amplifiers 254, 232, 180, and 208 can all be on a single chip. Further, in place of using zener diodes and resistors as a reference voltage, a single integrated boltage regulator can be used as a reference voltage. Further, if desired, a diode can be placed between input line 206 of operational amplifier 208 and the battery for the purpose of discharging capacitor 204 after switch 176 is opened to place the circuit in condition for the next cycle. Further, if desired, input line 186 of operational amplifier 180 can be connected to a rheostat for selective balancing of the bridge arms represented by resistors 198 and 200.

Battery protection device 10 in accordance with the invention prevents unintended drain of battery 14 through the use of an arrangement which is readily installed in existing electrical systems and is readily operated by unskilled persons. Once installed, the arrangement need not be removed, the fuse-switch assembly 156 providing a disabling means if desired. Battery protection device 10 may be formed of light-weight materials and can be supported by the battery cable 12, 13 without additional brackets, if desired.

It will thus be seen that the objects set forth above, and those made apparent from the preceding description, are effeciently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for protecting a battery which provides starting power to a motor and auxiliary power to a load normally powered by a generator driven by said motor, comprising mechanical switch means for connection intermediate said battery and load; first circuit means for detecting current flowing from said battery to said load and integrating a signal representative of said detected current; second circuit means for producing a control output signal when the product of said integration reaches a predetermined level; and electrical switch means operatively coupled to said mechanical switch means and to said second circuit means for opening said mechanical switch means in response to said control output signal, said first circuit means being adapted for operative coupling to said generator for disabling the production of said control output signal when said generator is operative.

2. The device as recited in claim 1, wherein said first circuit means includes bridge circuit means for comparing a first reference voltage and a second voltage, said second voltage having a component which is proportional to the current flowing from said battery to said load for the detection of said current.

3. The device as recited in claim 2, wherein said mechanical switch means is adapted for connection in a cable at least in part coupling said battery and said load, said first circuit means including coupling means for electrically connecting a length of said cable in said bridge circuit means for providing a voltage proportional to current flow from said battery to said load.

4. The device as recited in claim 3, including a housing supporting said mechanical switch means, said first and second circuit means and said electrical switch means, said coupling means including a coupling wire extending from said housing a predetermined length for electrical connection substantially at its end, when fully extended, to said cable.

5. The device as recited in claim 4, wherein said battery, mechanical switch means and cable define an electrical path, said first circuit means including conductive means in said housing electrically coupled to said electrical path in the vicinity of said mechanical switch means for defining, together with said coupling wire, a length of said cable through which current from said battery flows to said load, said current passing through said length of cable defining a voltage proportional to said current flow.

6. The device as recited in claim 4, including first and second terminal means supported by said housing, said cable being divided in two sections having adjacent ends, the respective adjacent ends of said cable sections being respectively connected to said first and second terminal assemblies, said mechanical switch means including first and second fixed contact portions respectively electrically coupled to said first and second terminal means and a displaceable contact portion selectively displaceable into and out of engagement with said first and second fixed contact portions for opening and closing the current path between said battery and said load.

7. The device as recited in claim 6, wherein said mechanical switch means includes means normally biasing said displaceable contact portion out of electrical contact with said fixed contact portions, index means for retaining said displaceable contact portion in electrical connection with said fixed contact portion, and means operatively coupling said index means and said electrical switch means for releasing said index means to permit the displacement of said displaceable contact portion by said bias means in response to the actuation of said electrical switch means to disconnect said load from said battery.

8. The device as recited in claim 7, wherein said mechanical switch means includes reset means manually manipulatable by a user to displace said displaceable contact portion into electrical contact with said fixed contact portions for retention by said index means.

9. The device as recited in claim 8, wherein said electrical switch means includes solenoid means for displacing said index means.

10. The device as recited in claim 2, wherein said bridge circuit means includes first and second outputs respectively representative of said first and second voltages, said first circuit means including operational amplifier means having as its input said first and second outputs of said bridge circuit means, and integrator circuit means having as its input the output of said operational amplifier means whereby an output is produced at said operational amplifier means when said load is drawing current from said battery when said generator is inoperative.

11. The device as recited in claim 10, including second operational amplifier means having as a first input the output of said integrator circuit means and having as its second input a reference voltage, said second operational amplifier means producing said control output signal when the output of said integrator circuit exceeds said reference voltage.

12. The device as recited in claim 11, wherein said electrical switch includes solenoid means actuatable in response to said control output signal to open said mechanical switch means.

13. The device as recited in claim 1, including further manually mamipulative switch means for disabling at least said first circuit means to render said battery protection device inoperative while retaining said mechanical switch means in its closed position.

14. The device as recited in claim 1, wherein said first circuit means includes means for resetting the product of said integration in response to the operation of said generator.

15. The device as recited in claim 1, wherein said first circuit means includes AC detection means for detecting and AC signal in the current flowing from said battery to said load representative of the operation of said generator and for producing an output signal in response thereto, said first circuit means being adapted to disable the production of said control output signal in response to an output signal from said AC detection means.

16. The device as recited in claim 10, wherein said first circuit means includes AC detection means coupled to detect an AC signal in the current flowing from said battery to said load representative of the operation of said generator and for producing an output in response thereto, said AC detection means being coupled to an input to said operational amplifier means to cause the output of said operational amplifier means to be low without regard to the voltages at the output of said bridge circuit means.

17. The device as recited in claim 16, wherein said AC detection means includes AC amplifier means AC coupled to receive the current between the battery and the load, rectifier means for rectifying the output signal of said AC amplifier means, third operational amplifier means having first and second inputs and an output, and reference voltage means coupled to the first input of said third operational amplifier means, said rectifier means being coupled to the second input of said third operational amplifier means, said output of said third operational amplifier means being applied to one of the inputs of said first-mentioned operational amplifier means.

18. A device for protecting a battery which provides starting power to a motor and auxiliary power to a load normally powered by a generator driven by said motor, comprising mechanical switch means connected intermediate said battery and load, circuit means for detecting current flow through said mechanical switch means from said battery to said load and for producing a control output signal in response to a predetermined drain from said battery, means for detecting the operation of said generator for rendering said circuit means inoperative during operation of said generator; and electircal switch means operatively coupled to said mechanical switch means and to said circuit means for opening said mechanical switch means in response to said output control signal, said mechanical switch means including a pair of fixed contact means, a displaceable contact means displaceable between a first position in electrical contact with said fixed contact means and a second position out of electrical contact therewith, means for biasing said displaceable contact means into its first position, index means for holding said displaceable contact means in its first position against the force of said bias means, and means operatively coupling said electrical switch means and index means for the selective release of said index means to effect opening of said switch means.

19. The device as recited in claim 18, wherein said mechanical switch means includes an elongated rod member formed with an indexing groove thereon, said biasing means including coil spring means extending about said rod member and supporting said displaceable contact means for displacement relative to said rod member and said fixed contact means and stop means for limiting the displacement of said spring, said stop means being in part mounted on said rod member, said index means including an index lever pivotably mounted for cooperation with said rod member groove at one position of said index lever for retaining said displaceable contact means in its first position, said means coupling said electrical switch means and said index means displacing said index lever out of registration with said groove to permit displacement of said displaceable contact means.

20. The device as recited in claim 19, including housing means supporting said mechanical switch means, electrical switch means and circuit means, said rod member projecting outside of said housing means for manual manipulation, and including means biasing said index lever into the position in registration with the position of said groove when said displaceable contact means is in its first position, said mechanical switch means being resettable by manual displacement of said rod member to bring said index lever when said electrical switch means is inoperative.

* * * * *